Dec. 23, 1969  R. M. L. DE ROZARIO  3,485,006
CONNECTION OF A GIRDER WITH ONE OR MORE
BARS ANGULARLY POSITIONED ON IT
Filed April 26, 1967  2 Sheets-Sheet 1

Richard Maria Leonard de Rozario,
INVENTOR.

BY Wenderoth, Lind
and Ponack, Attorneys

United States Patent Office 3,485,006
Patented Dec. 23, 1969

3,485,006
CONNECTION OF A GIRDER WITH ONE OR MORE BARS ANGULARLY POSITIONED ON IT
Richard Maria Leonard De Rozario, Vierpolders, Netherlands, assignor to Globe-Lak N.V., Dordrecht, Netherlands
Filed Apr. 26, 1967, Ser. No. 633,992
Claims priority, application Netherlands, May 5, 1966, 6606122
Int. Cl. E04c 3/30, 3/02; E04h 12/22
U.S. Cl. 52—731                                             2 Claims

ABSTRACT OF THE DISCLOSURE

A connection of a girder with a bar angularly positioned on it comprising a bar having a recess and a girder having an aperture for receiving the bar. The girder has on both sides within the girder a resilient tongue extending into the recess on the bar to form a snap-lock so that said snap-lock in mounted position secures said bar in said girder. The girder is formed of two parts secured by snap-locks.

---

Figure 1:
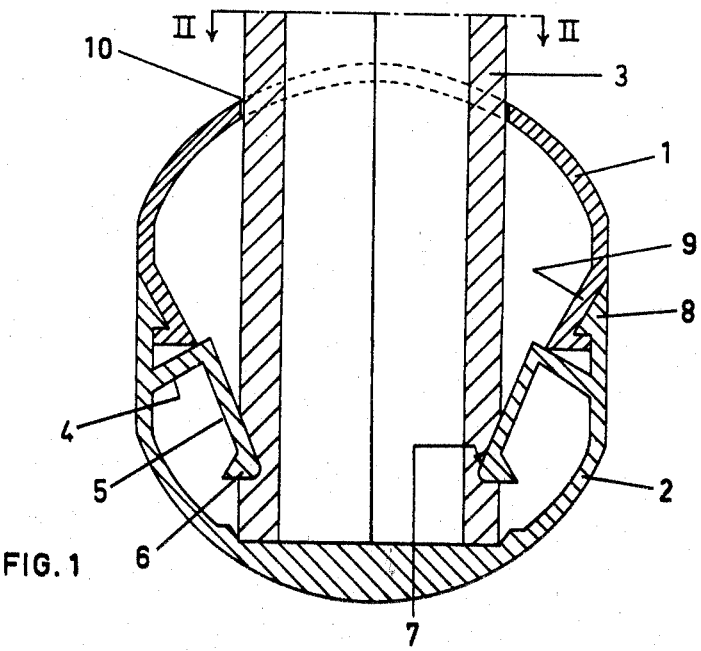

With fences, e.g. consisting of girders and bars it is usual to mutually connect girders and bars by welding or otherwise. Since modern machines allow of profiles in a variety of shapes being manufactured a quite different way of joining or connecting has developed in such a way that welding neither belongs to the essential operations and that further bolts, nuts and the like can entirely be avoided. Then the girder is provided with one or a plurality of receiving apertures for the bars whereas on both sides within the passage of a bar at least one resilient lip or tongue extends which together with a recess in the bar forms a snap-lock. It is possible however that as a result of an unfavourable load said snap-lock no longer functions properly. So as to make a separation between the bar or bars and the girder possible with all associated dangers.

The object of the invention is to remove the difficulties mentioned above which is achieved in that the snap-lock is such designed that it is secured in the bar's mounted position.

According to one embodiment of the invention the inner wall of the girder, at least at the location of the receiving aperture for the bar, is formed with a resilient lip or tongue directed inwardly and towards the bottom of the girder, said lip or tongue being positioned in a recess of the bar, said recess also being directed towards the bottom of the girder, the upward movement of which lip or tongue being blocked in the bar's mounted position. So after mounting the bar into the girder, it is impossible, by whatsoever external force, to separate them one from the other.

A preferential embodiment is that in which the girder is bipartitely designed, having a partition in horizontal direction, with said parts being connected one to the other also by a snap-lock and the lip or tongue which cooperates with the bar at the same time being secured.

The snap-lock for the parts of the girder is formed here by a hook-shaped edge of the lower part and an equally hook-shaped edge of the upper part, said edges as a result of resiliency having passed each other and thereafter having been snap-locked into each other, with the hook-shaped edge of the uppermost girder part at the same time blocking the snap-lock of the bar.

In another embodiment of the invention the girder is bipartitely designed having a partition in vertical direction, the edges of the girder parts facing each other being hook-shapedley designed such that they form a snap-lock, whereas said parts have lips or tongues directed to the passage aperture for the bar with hook-shaped ends formed on them, extending into a recess of the bar such that they form a double snap-lock with it.

After the two parts of the girder have been locked into each other it will also be ensured here that the two parts of the girder will not be capable of being separated, it neither being possible then to remove the bar from the girder in whatsoever way.

Figure 2:
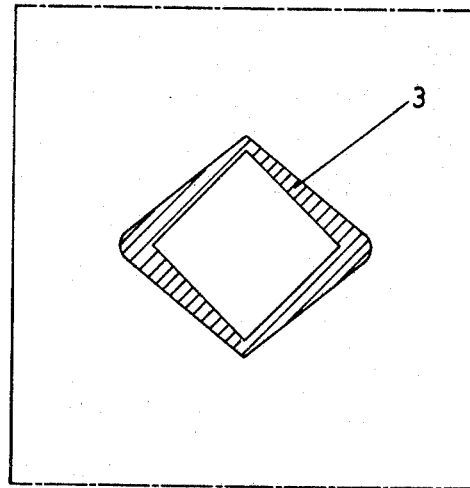
Figure 3:
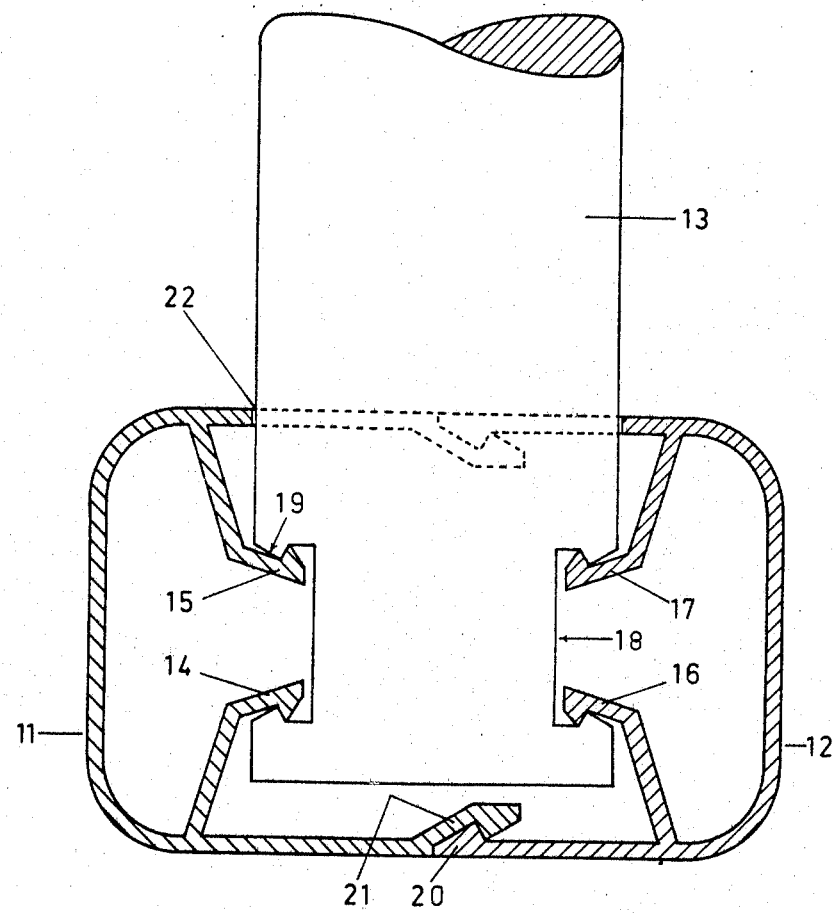

The invention will further be explained now in conjunction with the drawing. In the drawing:

FIG. 1 shows a cross-section of a first embodiment of a bar-girder joint or connection according to the invention;

FIG. 2 a section along the line II—II of FIG. 1 with a top view of the girder and FIG. 3 a cross-section along a differently designed bar-girder joint or connection according to the invention.

In the construction of FIG. 1 the girder consists of two parts 1 and 2 which e.g. may be made at any desired length by means of an extruding nozzle. 3 is a bar which as appears from FIG. 2 is substantially square and diagonally positioned in longitudinal direction of the girder. 4 shows an inwardly extending lip or tongue having a leg 5 which is directed to the bottom of the girder part 2, an end 6 of which leg 5 is of hook-shaped design.

The bar 3 has also recesses 7 formed in it, directed to the bottom of the girder part 2, into which recesses the hook-shaped portion 6 of the girder part 2 may be snap-locked. The upper edge of the girder part 2, as indicated by 8, is of hook-shaped design whereas the edges of the girder part 1 are also of hook-shaped design as indicated at 9 and this such that the edge parts 8 and 9 together form a snap-lock. In mounted position as shown in FIG. 1 the edge part 9 leans against the inwardly extending portion 4 of the lip or tongue 5, i.e. in mounted position any upward movement of the leg 5 is impossible so that neither the snap-lock hooks 6 can be removed any more from the snap-lock aperture 7 of the bar 3, by any force whatsoever. By mounting the bars 3 into the girders 1/2 in the way shown, the snap-lock apertures 7 may also be of rather deep design. So a rigid and reliable construction is achieved. The girder parts 1 have a plurality of apertures 10 formed on their upper side, into which the bars 3 may be inserted.

Although in FIG. 1 a partition of the girder 1/2 is represented in which the partition plane is substantially horizontal, FIG. 3 shows an embodiment having an essentially vertical partition.

11 represents the left and 12 the rght part of a girder. 13 shows the bar which is secured into the composed girder 11/12. The girder part 11 comprises inwardly directed lips or tongues 14/15 whereas the girder part 12 has corresponding inwardly directed lips or tongues 16 and 17. A recess 18 is formed in the bar 13, the walls of said recess, as shown at 19, being hook-shaped design. The lips or tongues 14, 15 and 16, 17 respectively may spring over the slanting hooks 19 and thereafter be snap-locked in the recesses disposed behind them.

The edges of the girder parts 11/12 are of hook-shaped design and this such that the hook-shaped edge 20 and the hook-shaped edge 21 together form a snap-lock. When the parts 11 and 12 with their snap-locks 20/21 are joined, the snap-locks 14, 15 and/or 16/17 respectively are blocked. Also in this case it is not possible, by whatsoever force to remove the bars 13 from the apertures 22 which encompass both girder parts 11/12.

Although in the specification and in the drawing "a bar" or "bars" and a "girder" are repeatedly referred to, this does not mean a restriction.

The invention may be applied in the manufacture of ladders or the like in which the rungs may be secured to the poles in the way described and drawn.

I claim:
1. A connection of a girder with a bar angularly positioned on it comprising a bar having a recess, a hollow girder having an aperture for receiving said bar, said girder comprising two parts secured together by snap-locks, said girder having on both sides within said girder a resilient tongue extending into said recess to form a snap-lock so that said snap-lock in mounted position secures said bar in said girder, said snap-lock comprises hook shaped edges on the lower part of said girder and similar hook shaped edges on the upper part of said girder and said hook shaped edge of said upper girder part blocking said snap-lock of said bar.

2. A connection of a girder with a bar angularly positioned on it comprising a bar having a recess, a hollow girder having an aperture for receiving said bar, said girder comprising two parts secured together by snap-locks, said girder having on both sides within said girder a resilient tongue extending into said recess to form a snap-lock so that said snap-lock in mounted position secures said bar in said girder, said girder having parts extending in vertical direction and the edges of said girder parts facing each other are hook shaped to form said snap-locks and said parts have tongues directed towards said aperture having hook-shaped ends extending into said recess to form a double snap-lock.

References Cited

UNITED STATES PATENTS

| | | | |
|---|---|---|---|
| 1,626,671 | 5/1927 | Enberg | 145—66 |
| 3,055,399 | 9/1962 | Bush et al. | 52—731 X |
| 3,196,495 | 7/1965 | Owen | 52—731 X |
| 3,305,221 | 2/1967 | Kling | 52—731 X |

FOREIGN PATENTS

| | | |
|---|---|---|
| 570,548 | 9/1958 | Belgium. |
| 1,164,999 | 5/1958 | France. |

ALFRED C. PERHAM, Primary Examiner

U.S. Cl. X.R.

52—692; 256—65; 287—56, 189.36